G. W. WARREN.
Wheel Cultivator.

No. 56,295. Patented July 10, 1866.

Witnesses:
C. H. Ellerbeck
B. S. Dodge

Inventor:
G. W. Warren
By W. C. Dodge
Atty

UNITED STATES PATENT OFFICE.

G. W. WARREN, OF MACOMB, ILLINOIS.

IMPROVEMENT IN CULTIVATORS.

Specification forming part of Letters Patent No. 56,295, dated July 10, 1866.

*To all whom it may concern:*

Be it known that I, G. W. WARREN, of Macomb, in the county of McDonough and State of Illinois, have invented certain new and useful Improvements in Cultivators; and I do hereby declare that the following is a full, clear, and exact description thereof, reference being had to the accompanying drawings, making part of this specification, and to the letters of reference marked thereon.

Like letters indicate like parts wherever they occur.

To enable others skilled in the art to construct and use the invention, I will proceed to describe it.

Figure 1:
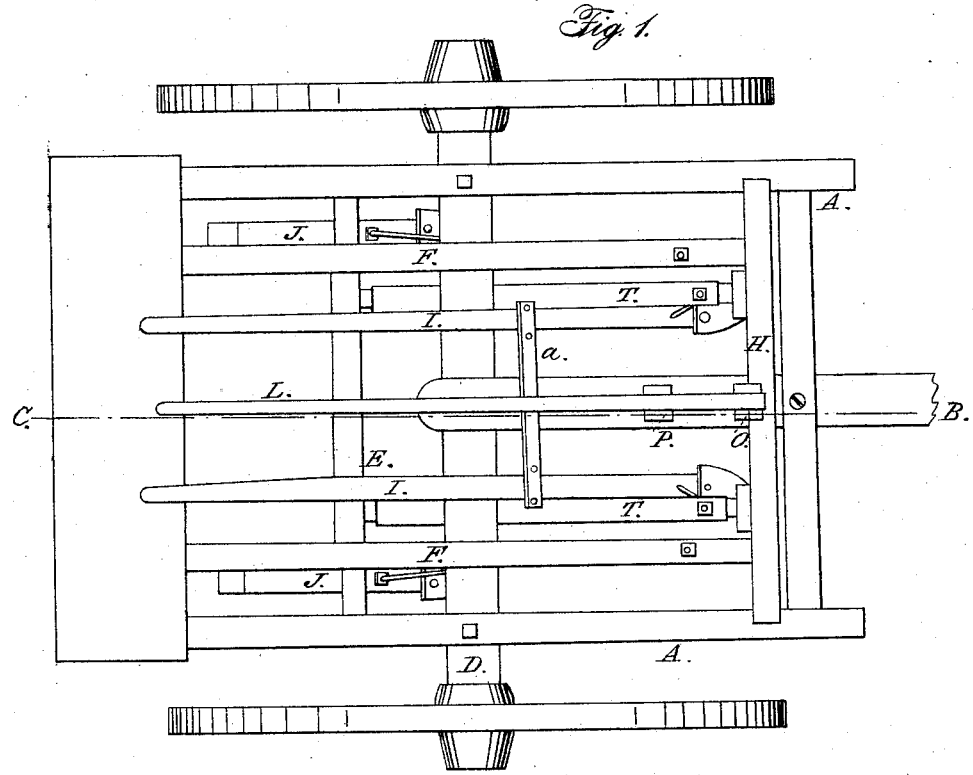
Figure 2:
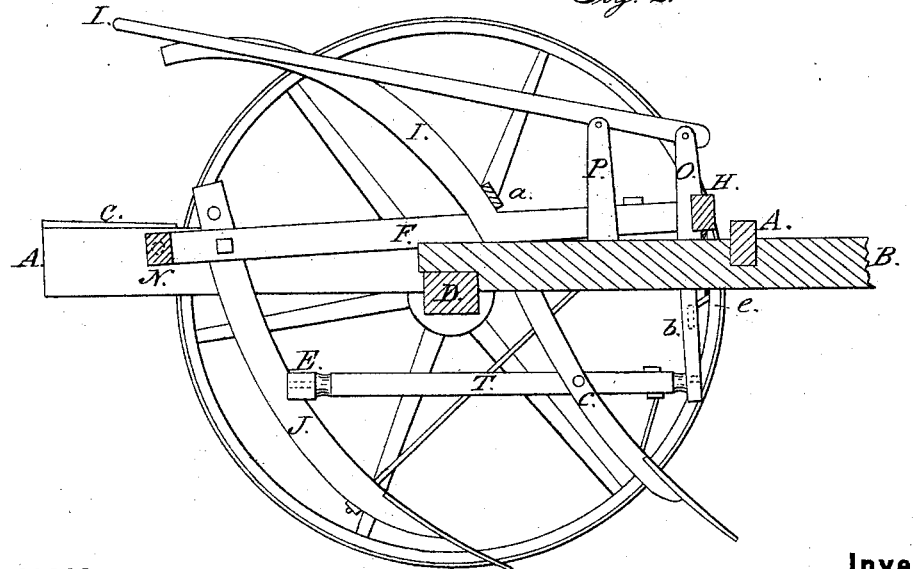

Figure 1 is a top-plan view, and Fig. 2 is a longitudinal vertical section taken on the line $x\ x$ of Fig. 1.

A represents the frame, which is secured firmly to the axle D, the tongue B being bolted rigidly to the axle and front cross-bar of the frame A. To the rear end of the main frame is secured a seat, C, upon which the operator sits. Within this main frame is secured another frame, consisting of the two longitudinal bars F, secured at their front end by a cross-bar, H, the rear end of bars F being secured to a cross-bar, N, which is journaled at its ends in the side bars of the main frame, underneath the seat, as shown in Fig. 2.

Near the rear ends of the bars F are secured the rear standards, J, having shovels attached in the usual manner. A cross-bar, E, is bolted firmly to these standards J, as shown, and from the front cross-bar H, are suspended rigidly two pendants, $b$, in line with the standards J. On each side a bar, T, is arranged underneath the main frame, as shown in Fig. 2, its rear end being journaled in the standard J and its front end in pendant $b$. To each of these bars T a shovel-standard, I, is bolted, as shown at $c$, Fig. 2, those standards I extending up in front of the axle and being curved backward, as shown, to bring their rear end within reach of the driver mounted on the seat C.

P represents a standard projecting upward from the tongue B, and having a lever, L, pivoted to it, the rear end of this lever extending back to the seat also, and having its front end attached to the cross-bar H of the inner frame by means of the post O. By depressing the rear end of this lever L the inner frame will be raised at its front end, turning on the journals of the rear bar, N, and thereby raising all the plows from the ground.

It will be seen that by this method of pivoting the standards to which the front plows are attached, and having their rear ends extend back, as shown, the driver will be able to guide and control their movements with great ease and facility, a bar, $a$, uniting the two standards I and causing them to move together, so that both may be operated simultaneously with one hand.

A screw-bolt, $e$, is inserted through the side bars of the main frame at their front ends, as shown in Fig. 2, in such a position that the ends of the cross-bar H of the frame, to which the plows or shovels are attached, will rest upon the upper ends of said screws. By adjusting these screws the depth that the shovels will enter the soil can be regulated or adjusted as may be desired.

For convenience in operating the screws $e$ their lower end is formed into a crank, as shown.

Having thus described my invention, what I claim is—

1. The inner frame, pivoted at its rear end to the main frame, having the two rear plows attached permanently thereto, and having the pivoted bars T secured to it, in the manner shown.

2. The long standards I, having the front shovels attached thereto, secured to the pivoted bars T underneath the axle and frame, and arranged as set forth.

3. The screws $e$, arranged to adjust the depth of the plows, in the manner shown and described.

G. W. WARREN.

Witnesses:
W. H. H. HANILINE,
J. H. PROVINE.